E. H. BRISTOL.
CHART HUB FOR RECORDING INSTRUMENTS.
APPLICATION FILED JAN. 26, 1912.

1,048,804.

Patented Dec. 31, 1912.

Witnesses:
Carl L. Choate.
Horace A. Crossman

Inventor:
Edgar H. Bristol,
by Emery, Booth, Janney & Varney
Attys.

UNITED STATES PATENT OFFICE.

EDGAR H. BRISTOL, OF FOXBORO, MASSACHUSETTS, ASSIGNOR TO THE INDUSTRIAL INSTRUMENT COMPANY, OF FOXBORO, MASSACHUSETTS, A CORPORATION OF CONNECTICUT.

CHART-HUB FOR RECORDING INSTRUMENTS.

1,048,804.  Specification of Letters Patent.  Patented Dec. 31, 1912.

Application filed January 26, 1912. Serial No. 673,524.

*To all whom it may concern:*

Be it known that I, EDGAR H. BRISTOL, a citizen of the United States, and a resident of Foxboro, in the county of Norfolk and State of Massachusetts, have invented an Improvement in Chart-Hubs for Recording Instruments, of which the following description, in connection with the accompanying drawings, is a specification, like characters on the drawings representing like parts.

My invention relates to measuring and recording instruments, being more particularly concerned with the provision of improved means for fastening the recording chart to the shaft by means of which the chart is rotated during the making of the record thereon.

The invention will be best understood by reference to the following description when taken in connection with the accompanying illustration of one specific embodiment thereof, while its scope will be more particularly pointed out in the appended claims.

Figure 1:
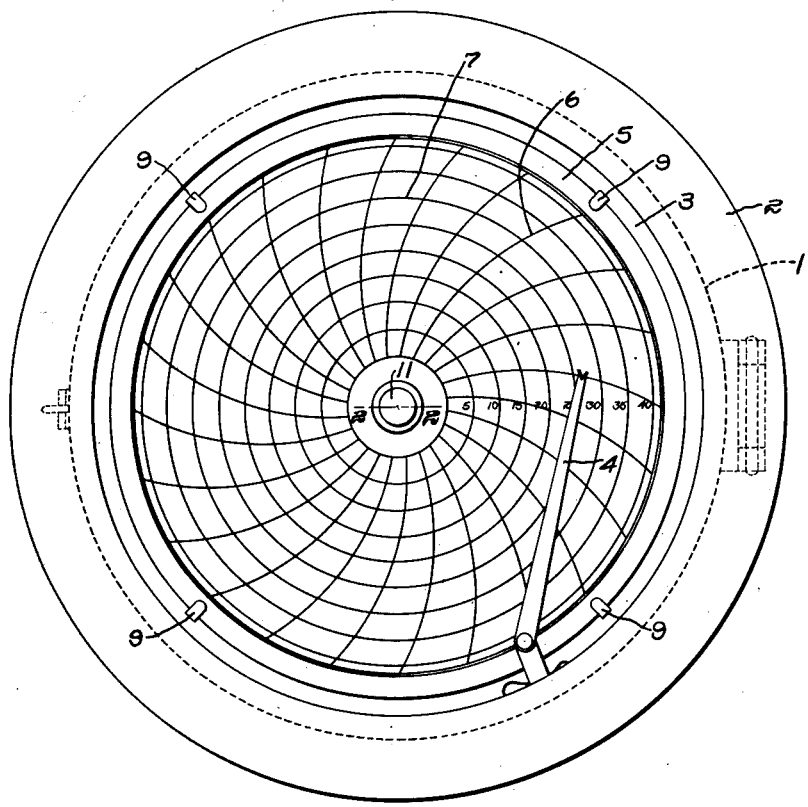
Figure 2:
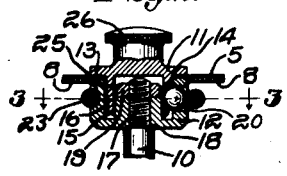
Figure 3:
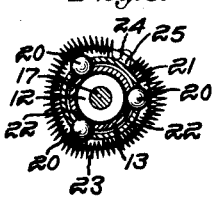
Figure 4:
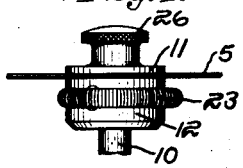

In the drawings: Figure 1 shows a front elevation of a recording instrument embodying my invention. Fig. 2 is a sectional view on line 2—2 of Fig. 1. Fig. 3 is a sectional view in plan taken on line 3—3 of Fig. 2, and Fig. 4 is a detail elevation of the chart hub with its shaft partly broken away.

Referring to the drawings and to the embodiment of my invention which I have there disclosed for illustrative purposes, I have there shown a recording instrument having a casing 1 of any usual construction, provided with a cover 2 having a glass 3 to protect the chart and the recording hand. A pivoted recording hand 4 is swung to and fro across the face of the chart by suitable means not shown and not forming an essential part of my present invention. This hand makes a record in the usual and well-known manner, which it will be unnecessary to describe herein, upon the chart 5 which is provided with suitable lines 6 representing divisions of time, and suitable lines 7 representing divisions of pressure or whatever other condition is desired to be recorded.

The chart 5 is placed upon the front face of a suitable platen 8 mounted within the casing 1 in any usual or desired manner and forming a backing or support for the chart while it is receiving its impression from the recording hand. This platen is as usual provided with fingers 9 extending a short distance onto the front face of the chart to keep it flat upon the platen while being rotated upon the latter. The chart is rotated by a shaft 10 having thereon a chart carrier comprising two clamping members 11 and 12 having opposed clamping faces which abut respectively against the front and back surfaces of the chart.

The member 11 is provided with a boss 13 projecting through a central perforation 14 provided in the chart 5 and into a recess 15 provided in the member 12 and extending into the latter from the clamping face thereof. This boss is provided with a slightly tapered portion 16 which enters the perforation in the chart and accurately centers the latter. The member 12 is secured to the shaft 10 in any suitable manner, herein by providing said shaft with a shank 17 having screw-threaded engagement with said member and having a shoulder 18 against which the latter is firmly secured to prevent its rotation on the shaft, there being also provided a lock-nut 19 to prevent rotation of the member 12 upon the screw-threaded shank of the shaft.

One important feature of my invention resides in the provision of the member 12 which preferably has no part whatever projecting through the perforation in the chart. On the contrary, however, when the member 11 is removed, the front end or clamping face of the member 12 lies substantially in the same plane as the front face of the platen 8, or in other words is flush therewith. This makes it possible to slide the chart into position across the face of the platen beneath the recording hand without materially disturbing the latter.

The members 11 and 12 are provided with suitable yielding means carried by one of these parts inter-engaging with the other to clamp the chart between the opposed clamping faces of the two members, and herein comprising one or more balls 20, herein three in number, located in suitable lateral pockets 21 provided in the member 12 and entering suitable lateral depressions 22 provided in the hub 13 of the member 11. These balls are normally held in the depressions 22 by suitable yielding means herein a spring 23 of the helical type having its ends hooked together at 24. This spring engages all three of the balls 20 and is located in a circumferential groove 25 provided in the member 12 which groove serves to prevent the spring from slipping up or down on the latter. Herein the depressions 22 are of conical form and are so placed that the balls 20 engage the conical surfaces on the side nearest to the nearer end of the boss 13 as will be evident from inspection of Fig. 2. It will be obvious that the inward pressure of the balls on these inclined surfaces will tend to draw the member 11 inwardly with respect to the member 12 and accordingly the chart will be clamped between the clamping faces of the two members by spring tension. This has the advantage of providing for a uniform clamping action upon the chart as compared with the use of a screw for this purpose.

Herein the member 11, which is the loose piece of the chart hub, is provided with a knurled head 26 by means of which it may be manipulated with the fingers. The member 11 may be removed by a forcible upward pull which will result in balls 20 being forced to recede into their respective pockets under the influence of the tapered surfaces of the depressions 22 in which said balls are normally located. When the loose piece is thus removed, the chart may be withdrawn from beneath the recording hand by a movement in the plane of the chart without disturbing the recording hand except to slightly lift its point from the surface of the chart. The chart thus removed will be replaced by a new one by a simple reversal of the foregoing operation, and in putting the loose member 11 into place it should be given a rotating movement in addition to its inward movement, in order to cause the balls to enter and seat themselves in their corresponding depressions as will be obvious.

One of the important features of my invention is in the placing of the chart centering device preferably upon the loose piece instead of upon the fixed piece of the hub, this construction being especially desirable because of the fact that it provides a flush surface across which the chart may be moved into position back of the recording end. This construction has also the further advantage of being quick and easy in operation as compared with the use of a screw, and moreover has the further advantage over the use of the screw in that the chart is held by uniform pressure, whereas the screw either insecurely holds the chart or else turns the latter from the position to which it has been adjusted with respect to the recording hand.

While I have herein shown and described one form of my invention for illustrative purposes, and have disclosed and discussed in detail the construction and arrangement incidental to one specific application thereof, it is to be understood that the invention is limited neither to the mere details or relative arrangement of parts nor to its specific application herein shown, but that extensive deviations from the illustrated form or embodiment of the invention may be made without departing from the principles thereof.

Having thus described my invention, what I claim is:

1. The combination of a chart provided with a perforation, a chart carrier comprising two parts one of which is provided with a recess and the other of which extends through said perforation into said recess, and yielding means carried by one of said parts and interengaging with the other, said yielding means comprising a rounded engaging member and a spring urging the latter into engagement with the other part.

2. A chart hub having, in combination, two parts having opposed clamping faces, one of said parts being provided with a recess extending thereinto from its clamping face, and the other of said parts extending into said recess, the recessed part being provided with a lateral pocket, a member located in said pocket and interengaging with other part, and a spring to hold said member normally in such interengagement.

3. A chart hub having, in combination, two parts having opposed clamping faces, one of said parts being provided with a recess extending thereinto from its clamping face, and the other of said parts extending into said recess, the recessed part being provided with a lateral pocket and the other part being provided with a lateral depression, a member located in said pocket and entering said depression, and a spring to hold said member normally in said depression.

4. A chart hub having, in combination, two parts having opposed clamping faces, one of said parts being provided with a recess extending thereinto from its clamping face, and the other of said parts extending into said recess, the recessed part being provided with a lateral pocket and the other part being provided with a lateral depression, a ball located in said pocket and entering said depression, and a spring to hold said ball normally in said depression.

5. A chart hub having, in combination, two parts having opposed clamping faces, one of said parts being provided with a recess extending thereinto from its clamping face, and the other of said parts extending into said recess, the recessed part being provided with a plurality of lateral pockets, and the other part being provided with corresponding lateral depressions, a plurality of balls located in said pockets, respectively, and entering said depressions, and yielding means to hold said balls normally in said depressions.

6. A chart hub having, in combination, two parts having opposite clamping faces, one of said parts being provided with a recess extending thereinto from its clamping face, and the other of said parts extending into said recess, the recessed part being provided with a plurality of lateral pockets, and the other part being provided with corresponding lateral depressions, a plurality of balls located in said pockets, respectively, and entering said depressions, and a circumferential spring engaging said balls and acting to hold the latter in said depressions.

7. A chart hub having, in combination, two parts having opposed clamping faces, one of said parts being provided with a recess extending thereinto from its clamping face, and the other of said parts extending into said recess, the recessed part being provided with a plurality of lateral pockets, and the other part being provided with corresponding lateral depressions, a plurality of balls located in said pockets, respectively, and entering said depressions, and a circumferential spring engaging said balls and acting to hold the latter in said depressions, said recessed part being provided with a circumferential groove in which said spring is located.

8. In a recording instrument, the combination of a chart, a platen against the front face of which said chart is disposed, and a chart-carrier comprising an inner clamping member and an outer clamping member, the inner clamping member having its outer end substantially flush with the outer face of the platen and being provided with a recess extending inwardly from its said outer end, and the other member extending through the plane of the chart into said recess, said members having provision for clamping the chart therebetween.

9. The combination of a chart for a recording instrument, with interengaging chart holding devices, one of said devices engaging the other with a frictional grip whereby said devices may be separated by merely pulling them apart.

10. The combination of a chart for a recording instrument, with inter-engaging chart holding devices, one of said devices engaging the other with a frictional grip whereby said devices may be separated by merely pulling them apart, the rear device being flush with the plane of the chart.

11. The combination of a chart for a recording instrument, with the inter-engaging chart holding devices, and yielding means on one of said devices engaging the other with a frictional grip whereby said devices may be separated by merely pulling them apart.

In testimony whereof, I have signed my name to this specification, in the presence of two subscribing witnesses.

EDGAR H. BRISTOL.

Witnesses:
 BENNET B. BRISTOL,
 BERTHA M. STEARNS.